Sept. 8, 1959
H. S. FOSTER ET AL
2,903,112
TORQUE LIMITING CLUTCH
Filed Jan. 4, 1956
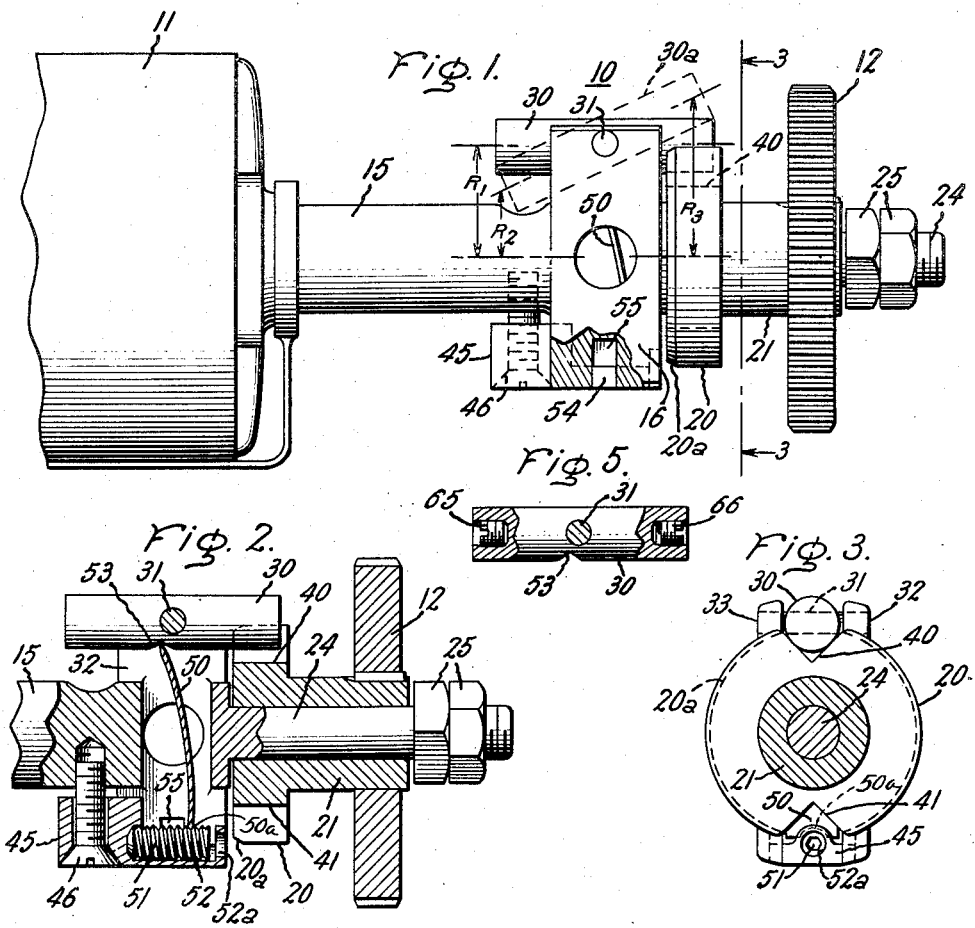
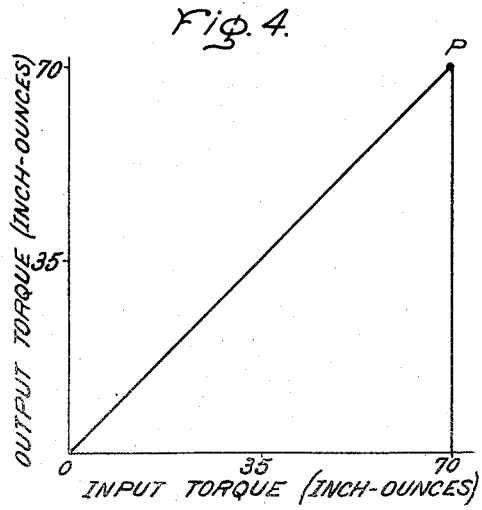
Inventors:
Chauncey E. Warner,
Robert E. Bosch,
Harold S. Foster,
by Claude H. Mott.
Their Attorney.

United States Patent Office 2,903,112
Patented Sept. 8, 1959

2,903,112

TORQUE LIMITING CLUTCH

Harold S. Foster, Ontario, Calif., Robert E. Bosch, Bloomfield, N.J., and Chauncey E. Warner, Schenectady, N.Y., assignors to General Electric Company, a corporation of New York Application January 4, 1956, Serial No. 557,417

7 Claims. (Cl. 192—104)

This invention relates to a torque limiting clutch and has for its object the provision of a simple, reliable clutch capable of transmitting torque up to a predetermined limit and of free running thereafter with no wear or heating of the torque transmitting members of the clutch.

One use of the clutch of this invention is in systems of the type disclosed in copending application Serial No. 401,254, Slipping Clutch, of Howard I. Becker, filed December 30, 1953, and assigned to the assignee of the present invention, wherein a reversible motor or prime mover drives a load through a clutch, and wherein the load driven by the output shaft of the clutch frequently encounters a mechanical stop. One such system is a servo search system wherein the clutch drives a reversibly rotatable antenna. It has been customary in the past in such systems to use ordinary friction clutches for transmitting torque between the motor or prime mover and the load. However, when the load encounters a mechanical stop, considerable slippage of the clutch usually occurs before the direction of the motor is reversed. Such slippage of the ordinarily used friction clutch is accompanied by considerable scoring and mechanical wear between the torque transmitting members of the clutch. Another undesirable feature of this slippage is the large amount of heat generated between the clutch members. Thus, as a consequence of this slippage, the clutch will soon become overheated and scored so that the torque will increase considerably, and the motor itself will be damaged or overheated.

Briefly stated, in accordance with one aspect of this invention, a torque limiting clutch is provided including a rotatably mounted driving member and a rotatably mounted driven member, together with means of coupling the driving member to the driven member during operation of the clutch until a pre-determined transmission torque is reached and for uncoupling these members when the predetermined transmission torque is exceeded. This means is responsive to centrifugal force after the predetermined torque setting is exceeded, the centrifugal force acting to maintain the coupling and uncoupling means in the uncoupled position.

The invention will be better understood from the following description together with the accompanying drawing, and its scope will be pointed out in the appended claims.

In the drawing, Figure 1 is an elevation view partly in section illustrating one embodiment of this invention;

Figure 2 is a view partly in section of the clutch portion of Figure 1;

Figure 3 is an end view of the clutch taken along line 3—3 of Figure 1;

Figure 4 is a graph showing the linear relation between output torque and input torque during operation of a clutch illustrating this invention;

Figure 5 is a view illustrating an alternative embodiment of the coupling rod of Figures 1–3.

Referring more particularly to the drawings, in Figure 1 there is provided a torque limiting clutch 10 illustrating one embodiment of this invention. A reversible driving motor serves as a prime mover imparting torque to the clutch and a ring gear 12 receives the output torque from the clutch and adapts it for connection to a load.

The clutch illustrated in the drawings comprises a driving member 15 in the form of a shaft connected to the motor 11 and having a yoke member 16 formed integrally therewith.

A rotatably mounted driven member is provided and comprises a disc 20 formed integrally with a hub 21 onto which is splined the output ring gear 12. As illustrated the driven member is mounted for rotation about a shaft 24 which is formed as an integral portion of the driving member 15; however, it is to be understood that the driven member can be mounted for rotation independently of the driving member within the scope of this invention. The driven member is held on the shaft 24 by nuts 25 secured on the threaded portion of the shaft 24.

Means are provided for coupling the driving member to the driven member during operation of the clutch until a pre-determined transmission torque is reached and for uncoupling these members when the pre-determined transmission torque is exceeded, said means being responsive to centrifugal force after said pre-determined torque is exceeded, said centrifugal force acting to maintain said means in the uncoupled condition. In the illustrated embodiment this means comprises a coupling rod 30 disposed axially of the clutch and being pivotally mounted at its center of gravity on the driving member 15. The pivotal connection is by a pin 31 extending through the coupling rod 30 and through bores in the walls 32 and 33 of the yoke member 16 which is an integral part of the driving member. This coupling and uncoupling means also includes a V-shaped detent 40 formed in the periphery of the disc 20 of the driven member. The construction and arrangement of the clutch is such that when it is in its engaged position, the coupling rod 30 is substantially parallel to the axis of rotation and has one of its ends lying partially within and in engagement with the detent 40. An additional detent 41 is provided in the driven member disc 20 for the purpose of balancing the disc. Also, the driven member disc has a beveled portion 20a provided to prevent sharp edged contact with the rod 30.

Torque limiting adjusting means are provided for varying the setting of the pre-determined torque of transmission of the clutch of this invention. This means comprises a block 45 contiguous to the yoke member 16 and adjustably fastened to the shaft 15 of the driving member by a cap screw 46. A column spring 50, housed within the yoke member 16, is maintained in compression between the coupling rod 30 and a set screw 51 fitting within an axially disposed bore 52 in the block 45. One end of the column spring 50 tapers to a point and engages a detent 53 formed on the underside of the coupling rod 30 at a position displaced from the center of gravity of the rod in a direction away from the driven member of the clutch. The other end of the column spring is similarly tapered and rides on the threaded portion of the set screw 51. To increase the area of the column spring end contacted by the set screw 51, the end may be formed with a notch or slight curvature 50a. The column spring thus mounted forms a biasing means for urging the coupling rod into engagement with the detent 40 on the driven member disc 20.

It will be noted that the adjustable block 45 is movable toward and away from the shaft 24 by means of cap screw 46, the tongues 54 (only one shown) on the block 45 cooperating with grooves 55 (only one shown) in the yoke 16 to guide such movement of the block. Such movement varies the force exerted by the column spring 50 on the rod 30 and thereby varies the torque setting of the clutch.

The set screw 51 acting within the block 45 on the column spring 50 provides a means for adjusting the speed at which the clutch will reengage. Rotation of the set screw 51, as by inserting a wrench through the bore 52a in the block 46 causes movement of the lower end of the column spring 50 along the threads of the set screw. For example, if the set screw 51 is rotated clockwise (looking at Figure 3), the lower end of the column spring 50 will move to the right (looking at Figure 2). Conversely, counterclockwise rotation of set screw 51 causes the lower end of colmn spring 50 to move to the left. Such movement changes the location of the center of the spring 50 with respect to its point of contact with the detent 53 of rod 30. This reengagement speed adjustment can be made so that the rod almost floats in the 30a position during disengagement of the clutch because the force exerted by the spring 50 can be adjusted to a value just slightly less than the force exerted by centrifugal force on the driven member end of the rod 30 at the desired reengagement speed which may be a very low speed, approaching zero.

*Operation*

In operation, the torque limit adjusting means is set at a pre-determined torque beyond which it is desired that the clutch disengage. During rotation of the clutch, torque is transmitted from the driving member to the driven member through the coupling rod 30 which is maintained in engagement with the detent 40 on the driven member by the functioning of the biasing means described above including the column spring 50. When the torque setting is exceeded, for example when the load on the driven member strikes a stop or when the load for other reasons exceeds the allowable limit, the force produced by the overloaded condition causes the detent 40 of the driven member to act against the pressure of the column spring 50 to force the coupling rod 30 out of engagement with the detent 40. This position of the coupling rod 30 is shown in dotted lines in Figure 1 as 30a. When the coupling rod 30 moves to position 30a, the clutch members are uncoupled and the clutch driving member is in a free running condition.

The coupling and uncoupling means of this clutch is responsive to centrifugal force after the pre-determined torque is exceeded, this centrifugal force acting to maintain the means in the uncoupled condition. This function will be understood by referring to Figure 1 where it will be noted that in the coupled or engaged position of the clutch, the coupling rod 30 is substantially parallel to the axis of rotation of the clutch, and the centers of each end of the coupling rod 30 lie at points equidistant from the axis of rotation of the clutch, that is at a distance or radius $R_1$. Thus, the centrifugal forces acting on opposite ends of the coupling rod 30 while it is in the coupled position are substantially equal. However, as soon as the coupling rod 30 moves about the pivot pin 31, in response to an overloaded condition to a position such as 30a, the centrifugal force acting on the detent end of the coupling rod 30 acts through a radius $R_3$ and consequently is a much greater force than the centrifugal force acting on the opposite end of the rod since the latter force is acting through a shorter radius $R_2$.

An important feature of the operation of the clutch of this invention is that during normal torque transmission, centrifugal force has no effect on the coupling or uncoupling of the clutch members, while in the uncoupled or free running condition of the clutch centrifugal force is utilized and acts to maintain the means in the uncoupled condition.

Referring now to Figure 4, it will be observed that there is a straight line relation between the input torque and the output torque of the clutch illustrating this invention up until the pre-determined torque setting is reached. In this example the pre-determined torque setting was 70 inch ounces, and as soon as this torque setting was exceeded (point P), the input torque remained at 70 inch ounces while the output torque immediately dropped to zero.

Re-engagement of the clutch takes place after the speed of rotation of the driving member is reduced to the point where the centrifugal force tending to maintain the coupling rod in its angular position is overcome by the force of the biasing means including the column spring 50 tending to return the coupling rod to its parallel or coupled position. At this time the clutch becomes re-engaged and providing the transmission torque is less than the pre-determined setting, normal torque transmission is resumed. However, if the transmission torque is again greater than the predetermined limit torque, then uncoupling of the driving and driven members again occurs as described above.

An alternative embodiment is shown in Figure 5 wherein the coupling rod 30 is provided at each end with threaded slugs 65 and 66 received within threaded bores in the ends of the rod. The function of these slugs is to add weight to the ends of the coupling rod 30 and thereby increase the effect of the centrifugal force discussed in connection with the Figure 1–3 embodiment of this invention. It will be readily appreciated that slugs 65 and 66 may be replaced by similar slugs of a different mass for the purpose of adjusting the amount of variation in the effect of the centrifugal force.

While particular embodiments of the invention have been illustrated and described, modifications thereof will readily occur to those skilled the art. It should be understood therefore that the invention is not limited to the particular arrangements disclosed but that the appended claims are intended to cover all modifications which do not depart from the true spirit and scope of the invention.

What is claimed as new and desired to be secured by U.S. Letters Patent is:

1. A torque limiting clutch comprising a rotatably mounted driving member adapted to transmit torque, a rotatably mounted driven member, means for coupling the driving member to the driven member during operation of the clutch until a pre-determined transmission torque is reached and for uncoupling said members when the pre-determined transmission torque is exceeded, said means comprising a pivotally mounted means on said driving member and a detent means on said driven member, said pivotally mounted means being responsive to centrifugal force after said predetermined torque is exceeded, said centrifugal force acting to maintain said coupling means in the uncoupled condition, and means for adjusting the coupling and uncoupling means at any fixed torque setting to control the speed of rotation at which the clutch reengages after uncoupling of said members.

2. A torque limiting clutch comprising a rotatably mounted driving member adapted to transmit torque, a rotatably mounted driven member, means for coupling the driving member to the driven member during operation of the clutch until a pre-determined transmission torque is reached and for uncoupling said members when the pre-determined transmission torque is exceeded, said means being responsive to centrifugal force after said pre-determined torque is exceeded, said centrifugal force acting to maintain said means in the uncoupled condition, and in which said means comprises a rod pivotally mounted at its center of gravity on said driving member and a detent on said driven member and said rod having its longitudinal axis displaced from and disposed parallel to the axis of rotation of said driving member, said rod and detent arranged to cooperate with each other.

3. A clutch as set forth in claim 2, said means further comprising biasing means for urging said rod into engagement with said detent.

4. A clutch as set forth in claim 3, further comprising an adjustment device for varying the amount of bias of said biasing means.

5. A clutch as set forth in claim 4, further comprising means for adjusting the coupling and uncoupling means to control the speed of rotation at which the clutch reengages after uncoupling of said members.

6. A torque limiting clutch comprising a rotatably mounted driving member, a rotatably mounted driven member, means for coupling the driving member to the driven member, during operation of the clutch until a predetermined torque is reached and for uncoupling said members when the predetermined torque is exceeded, said means being responsive during rotation of the driving member to centrifugal force when said members are uncoupled, whereby said members tend to remain in their uncoupled condition, said means comprising a coupling rod pivotally mounted at its center of gravity on said driving member and having its longitudinal axis displaced from and disposed parallel to the axis of rotation of said driving member, and a detent on said driven member, said rod and detent being arranged to cooperate with each other, and adjustable weights removably mounted on the opposite side of the pivot point of said rod for increasing the effect of centrifugal force thereon.

7. A torque limiting clutch comprising a rotatably mounted driving member, a rotatably mounted driven member comprising a disk having a radial detent in its outer surface and having an axis of rotation coinciding with that of the driving member, an axially disposed rod pivotally mounted at its center of gravity on said driving member so that the pivot axis of the rod is outward of and perpendicular to the axis of rotation of said driving member, said clutch being so constructed and arranged that, when in its engaged position, said rod is substantially parallel to the axis of rotation of the driving member and has one end in engagement with said detent, and biasing means for urging said rod into engagement with said detent.

References Cited in the file of this patent

UNITED STATES PATENTS

| | | |
|---|---|---|
| 2,207,038 | Trier et al. | July 9, 1940 |
| 2,304,162 | Gargolinski | Dec. 8, 1942 |
| 2,364,980 | Jimerson | Dec. 12, 1944 |
| 2,514,228 | Dodge | July 4, 1950 |
| 2,546,633 | Dodge | Mar. 27, 1951 |